(12) United States Patent
Maughon et al.

(10) Patent No.: US 7,022,789 B2
(45) Date of Patent: *Apr. 4, 2006

(54) TELECHELIC ALKADIENE POLYMERS WITH CROSSLINKABLE END GROUPS AND METHODS FOR MAKING THE SAME

(75) Inventors: Bob R. Maughon, Midland, MI (US); Takeharu Morita, Osaka (JP); Robert H. Grubbs, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/064,033

(22) Filed: Feb. 22, 2005

(65) Prior Publication Data

US 2005/0176906 A1 Aug. 11, 2005

Related U.S. Application Data

(60) Continuation of application No. 10/151,757, filed on May 21, 2002, now Pat. No. 6,867,274, which is a division of application No. 09/271,348, filed on Mar. 17, 1999, now Pat. No. 6,465,590.

(60) Provisional application No. 60/079,949, filed on Mar. 30, 1998.

(51) Int. Cl.
  *C08F 12/26* (2006.01)
  *C08F 20/68* (2006.01)

(52) U.S. Cl. .............. 526/264; 526/269; 526/270; 526/276; 526/333; 526/336; 526/339; 526/308; 526/319; 526/329; 526/171

(58) Field of Classification Search ............... 526/264, 526/269, 270, 276, 333, 336, 339, 308, 319, 526/329, 171
See application file for complete search history.

(56) References Cited

U.S. PATENT DOCUMENTS

| | | | |
|---|---|---|---|
| 5,312,940 A | 5/1994 | Grubbs et al. | |
| 5,710,298 A | 1/1998 | Grubbs et al. | |
| 5,728,917 A | 3/1998 | Grubbs et al. | |
| 5,831,108 A | 11/1998 | Grubbs et al. | |
| 6,465,590 B1 * | 10/2002 | Maughon et al. | ............ 526/264 |
| 6,867,274 B1 * | 3/2005 | Maughon et al. | ............ 526/264 |

OTHER PUBLICATIONS

Nubel, et al., "Preparation of an ester-terminated telechelic polybutadiene by a two-step olefin metathesis process," J. Mol. Catalysis A Chem. (1997) 115:43-50.

Kennedy, et al., "New telechelic polymers and sequential copolymers by polyfunctional initiator-transfer agents (inifers) 28. Glycidyl ethers of bisphenol- and trisphenol-PIB and their curing to epoxy resins," Polymer Bull. (1982) 8:571-578.

Kennedy, et al., "New telechelic polymers and sequential copolymers by polyfunctional initiator-transfer agents (inifers) 36. New networks from α, ω-di(methacryloyloxy)-polyisobutylene," Polymer Bull. (1983) 10:146-151.

Marmo, et al., "ADMET depolymerization. Synthesis of perfectly difunctional (f=2.0) telechelic polybutadiene oligomers," Macromolecules (1995) 28:2602-2605.

Chung, "Synthesis of functional polymers via borane monomers and metathesis catalysis," J. Mol. Catal. (1992) 76:15-31.

Otton, et al., "Metathesis of functionalized olefins: homogeneous cross-metathesis of cycloolefin and ethylenic esters," J. Mol. Catal. (1992) 76:15-31.

(Continued)

*Primary Examiner*—Robert D. Harlan
(74) *Attorney, Agent, or Firm*—Reed Intellectual Property Law Group

(57) ABSTRACT

The present invention relates to telechelic polymers having crosslinkable end groups of the formula

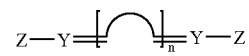

and methods for preparing the same wherein n is an integer;

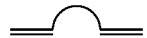

is an alkadienyl group; Y is an alkyl group; and Z is crosslinkable end group. In general, the inventive synthesis involves reacting a functionalized chain transfer agent having crosslinkable ends with a cycloalkene in the presence of a ruthenium or osmium catalyst of the formula

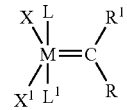

wherein:
  M is ruthenium or osmium;
  X and $X^1$ are independently any anionic ligand;
  L and $L^1$ are any neutral electron donor ligand;
  R and $R^1$ are each hydrogen or a substituted or unsubstituted substituent wherein the substituent is selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_1$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl. In another aspect of the invention, methods for controlling the molecular weight of the resulting telechelic polymer are also presented.

34 Claims, 3 Drawing Sheets

OTHER PUBLICATIONS

Pinazzi, et al., "Application of metathesis reactions to the synthesis of α, ω functional prepolymers," J. Mol. Catal. (1980) 8:313-324.

Gu, et al., "Synthesis of glycol diglycidyl ethers using phase-transfer catalysis," Synthesis (1985) 6:649-651.

Reyx, et al., "Application de la reaction de metathese a la synthese de prepolymeres α, ω-bifonctionnels. Partie 3: Mise au point des conditions d'obtention de composes dieniques et trieniques par cometathese du cyclopentense avec l'octene-4 et l'hexene-3 dioate de dimethyle," J. Mol. Catal. (1987) 42:289-299.

Cramail, et al., "Functional oligomers of norbornene. Part 1. Oligomerization by ring-opening metathesis polymerization in the presence of unsaturated diesters," J. Mol. Catal. (1991) 65:193-203.

Hummel, "Polymer degradation by cross-metathesis," Pure Appl. Chem. (1982) 54:351-364.

Aoshima, "Synthesis of functionalized linear poly (divinylbenzene) with hydroxyl pendants and/or endgroups," J. Polymer Sci. (1984) 22:2443-2453.

Webster, "Living polymerization methods," Science (1991) 251:887-893.

Kennedy, "New telechelic polymers and sequential copolymers by polyfunctional initiator-transfer agents (inifers) XVII. Epoxy and aldehyde telechilic polyisobutylenes," J. Polymer Sci. (1982) 20:2809-2817.

Chung, et al., "A new synthetic route to telechelic polymers," Macromolecules (1991) 25:3718-3720.

Chung, et al., "Synthesis of telechelic 1,4-polybutadiene by metathesis reactions and borane monomers," Macromolecules (1992) 25:5137-5144.

Marmo, et al., "Acyclic diene metathesis (ADMET) depolymerization synthesis of mass extract telechelic polybutadiene oligomers," Macromolecule (1993) 28:1333-1339.

Chasmawala, et al., "Telechelic polyisobutylene: a facile synthesis via the cross metathesis reaction and trialkylborane-containing olefins," Macromolecules (1995) 28:1333-1339.

Maughon, "Ruthenium alkylidene initiated living ring-opening metathesis polymerization (ROMP) of 3-substituted cyclobutenes," Macromolecules (1997) 30:3459-3469.

Hillmyer, et al., "Ring-opening metathesis polymerization of functionalized cyclooctenes by a ruthenium-based metathesis catalyst," Macromolecules (1995) 28:6311-6316.

Grubbs, et al., "Ring-opening metathesis and related processes in organic synthesis," Acc. Chem. Res. (1995) 28:446-452.

Fu, et al., "Catalytic ring-opening metathesis of functionalized dienes by a ruthenium carbene complex," J. Am. Chem. Soc. (1993) 115:9856-9857.

Maughon, "Synthesis and controlled cross-linking of polymers derived from ring-opening metathesis polymerization (ROMP)," Macromolecules (1996) 29:5766-5769.

Schwab, et al., "Synthesis and applications of $RuCl_2$ (=CHR')($PR_3$)$_2$: the influence of the alkylidene moiety on metathesis activity," J. Am. Chem. Soc. (1996) 118:100-110.

Schwab, et al., "Eine Reihe definierter Metathesekatalysatoren—Synthese von und Reaktionen mit $RuCl_2$(=CHR')($PR_3$)$_2$," Angew. Chem. (1995) 107:2179-2181.

Nguyen, et al., "Synthesis and activities of a new single-component ruthenium-based olefin metathesis catalyst," J. Am. Chem. Soc. (1993) 115:9858-9859.

Hillmyer, et al., "Utility of a ruthenium metathesis catalyst for the preparation of end-functionalized polybutadiene," Macromolecules (1997)30:718-721.

Fraser, et al., "Degradable cyclooctadiene/acetal copolymers: versatile precursors to 1,4-hydroxytelechelic polyethylene," Macromolecules (1995) 28:7256-7261.

Hillmyer, et al., "Chain transfer in the ring-opening metathesis polymerization of cyclooctadiene using discrete metal alkylidenes," Macromolecules (1995) 28:8662-8667.

Hillmyer, et al., "Preparation of hydroxytelechelic poly (butadiene) via ring-opening metathesis polymerization employing a well-defined metathesis catalyst," Macromolecules (1993) 26:872-874.

Fukui, et al., "Application of photo-crosslinkable resin to immobilization on an enzyme," FEBS Lett. (1976)66:591-596.

Van Caeter, et al., "Telechelic polymers: new developments," TRIP (1995)3:227-233.

Schwab, et al., "A series of well-defined metathesis catalysts—synthesis of [$RuCl_2$(=CHR')($PR_3$)$_2$] and its reactions," Angew. Chem. Intl. Ed. Engl. (1995) 34:2039-2411.

* cited by examiner

TELECHELIC ALKADIENE POLYMERS WITH CROSSLINKABLE END GROUPS AND METHODS FOR MAKING THE SAME

CROSS-REFERENCE TO RELATED APPLICATIONS

This application is a continuation of U.S. patent application Ser. No. 10/151,757, filed May 21, 2002, now U.S. Pat. No. 6,867,274, which is a divisional of U.S. patent application Ser. No. 09/271,348 filed Mar. 17, 1999, now U.S. Pat. No. 6,465,590. Priority under 35 U.S.C. §119(e)(1) to Provisional U.S. Pat. Application Ser. No. 60/079,949, filed Mar. 30, 1998 is claimed. The disclosures of the aforementioned applications are incorporated by reference in their entireties.

STATEMENT REGARDING FEDERALLY SPONSORED RESEARCH OR DEVELOPMENT

The U.S. Government has certain rights in this invention pursuant to Grant No. CHE-9509745 awarded by the National Science Foundation.

TECHNICAL FIELD

The present invention relates to telechelic polymers and methods for making the same. More particularly, the present invention relates to telechelic polymer segments of controlled molecular weight having crosslinkable end groups and methods for preparing the same.

BACKGROUND OF THE INVENTION

Telechelic polymers can be simply defined as polymers that bear reactive functional groups at their chain termini. The interest in these polymeric materials is derived from the fact that through these reactive end groups, a vast number of macromolecular materials can be prepared. Telechelic polymers have found application in the synthesis of block copolymers, star polymers, crosslinked polymer networks, and ionic polymer networks. Low molecular weight liquid telechelic polymers have been successfully used in reaction injection molding, and the formation of ABA triblock and multiblock copolymers via telechelic polymers has dramatically impacted the development of thermoplastic elastomers. Based on these numerous valuable applications, considerable research efforts have been devoted to improving the synthesis of telechelic polymers.

The development of telechelic polymers with crosslinkable end groups such as methacrylate or epoxide groups is of interest for the preparation of interpenetrating polymer networks, AB crosslinked polymeric materials, more thermally and chemically resistant materials, and for the immobilization of biomaterials. However, these reactive end groups have been typically incorporated through a post-polymerization transformation due to the instability of these functional groups to tolerate many of the typical conditions associated with polymerization reactions.

Recently, a non-metathesis-mediated polymer degradation approach was applied to polymers derived from ROMP. Copolymerization of cyclooctadiene ("COD") with either cis-4,7-dihydro-1,3-dioxepan (1) or cis-4,7-dihydro-2-phenyl-1,3-dioxepan (2) using well-defined ruthenium-based metathesis initiators, $(PCY_3)Cl_2Ru=CHR'$ (wherein $R'=Ph$ (3), or wherein $R'=(CH=CPh_2)$ (4)), resulted in a polymer bearing both poly(butadiene) and acetal units along the backbone. Subsequent acid hydrolysis of these acetal units resulted in the desired hydroxytelechelic poly(butadiene) ("HTPBD") oligomers in moderate yields. Although this method proved to be successful for the synthesis of HTPBD, this method is not generally applicable for the preparation of telechelic polymers with other functional end groups.

As a result, a need exists for methods for synthesizing telechelic polymers having a variety of end groups, particularly crosslinkable end groups and which do not require post-polymerization transformations for polymer functionalization.

SUMMARY OF THE INVENTION

The present invention relates to telechelic polymers having crosslinkable end groups of the formula

and methods for preparing the same wherein n is an integer;

is an alkadienyl group; Y is an alkyl group; and Z is a crosslinkable end group. In general, the inventive synthesis involves reacting a chain transfer agent having crosslinkable end groups with a cycloalkene in the presence of a ruthenium or osmium initiator of the formula

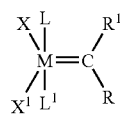

wherein:
  M is ruthenium or osmium;
  X and $X^1$ are independently any anionic ligand;
  L and $L^1$ are any neutral electron donor ligand;
  R and $R^1$ are each hydrogen or a substituted or unsubstituted substituent wherein the substituent is selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl.

In particularly preferred embodiments, the initiator is as described above wherein R is hydrogen, $R^1$ is phenyl or (—CH=$CPh_2$), X and $X^1$ are both chloride, and L and $L^1$ ligands are —P(cyclohexyl)$_3$; the cycloalkene is cyclooctadiene; and the chain transfer agent is cis-2-butene-1,4-diol dimethacrylate or cis-2-butene-1,4-diol diglycidyl ether.

DETAILED DESCRIPTION OF THE INVENTION

Figure 1:
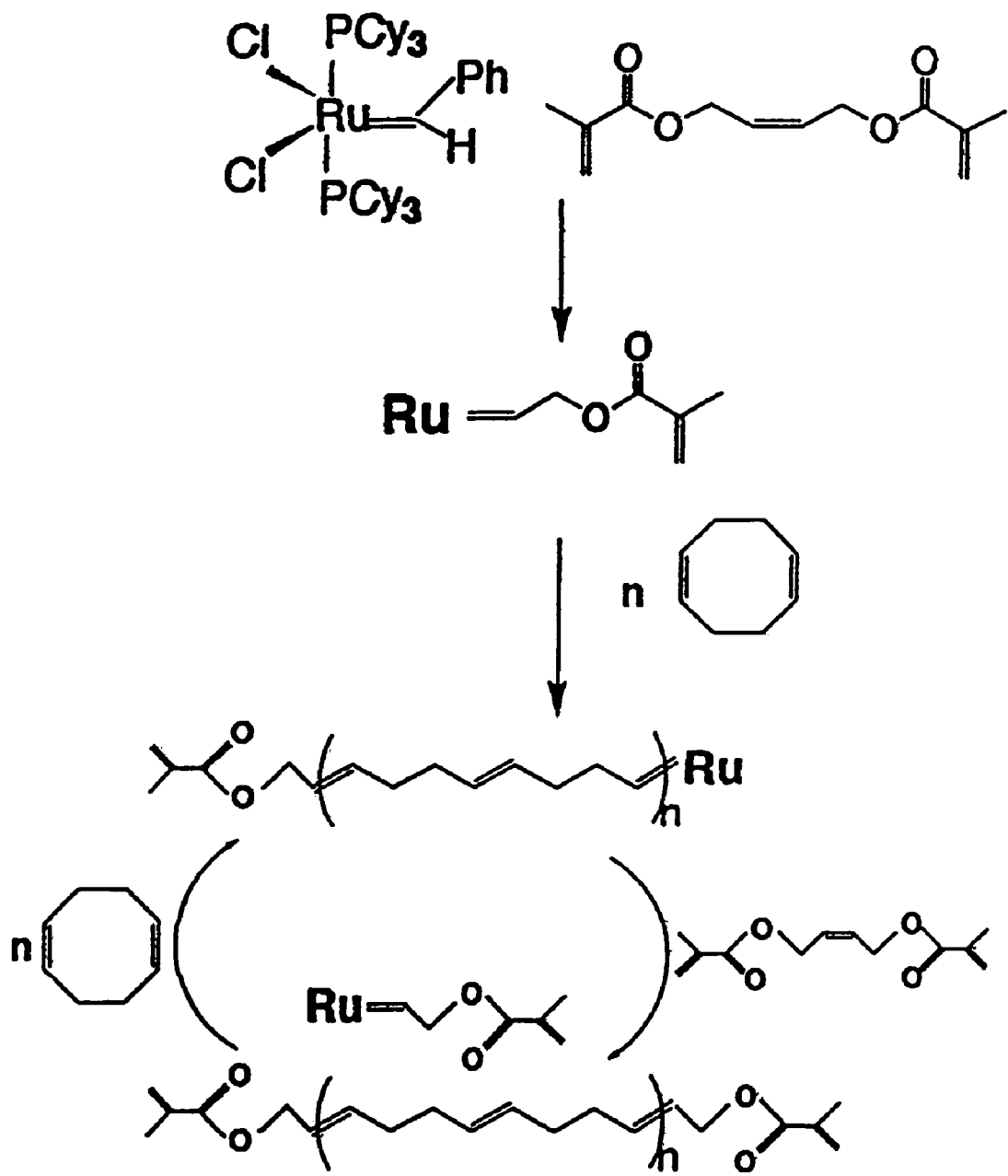
FIG. 1 is an illustrative reaction scheme for the synthesis of a telechelic polymer with methacrylate end groups.
Figure 2:
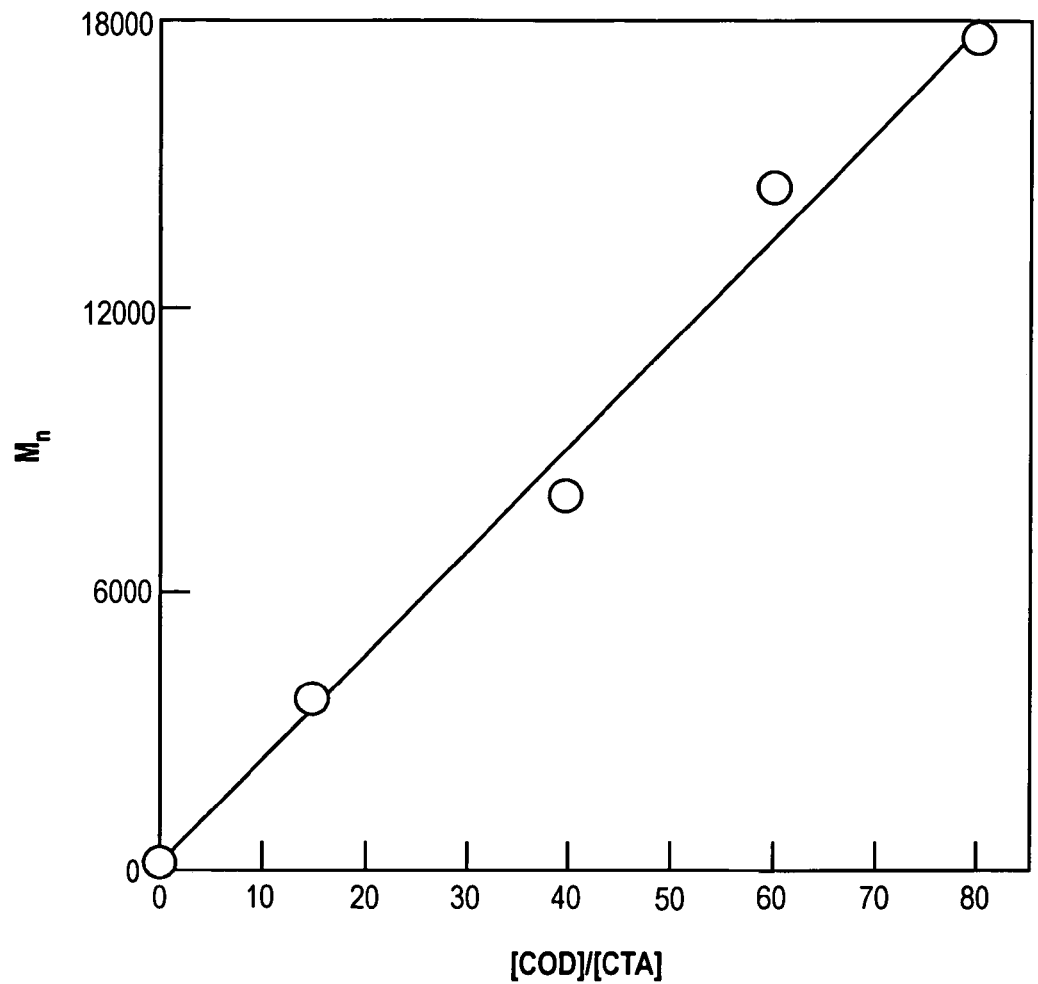
FIG. 2 is graphic representation of the dependence of the observed $M_n$ values for the bis(methacrylate)-functionalized telechelic poly(butadiene)s 9 on the (COD]/[CTA] ratio. The $M_n$ was determined by $^1$H NMR integration assuming a number average functionality of 2.0.

The present invention relates to novel organic polymers with crosslinkable end groups and to a simplified and direct procedure for the synthesis of these polymers. These crosslinkable end groups may be subsequently reacted to form a network of crosslinked polymers.

The present invention relates to unbranched or linear telechelic polymers of the general formula

wherein:
n is an integer;

is a alkadienyl group;
Y is an alkyl group; and,
Z is a crosslinkable end group.

As used herein, an alkadienyl group is a hydrocarbon having at least two carbon-carbon double bonds. In preferred embodiments,

is a $C_4$–$C_{20}$ alkadienyl group; Y is an $C_1$–$C_{10}$ alkyl and Z is selected from the group consisting of Z is selected from a group consisting of methacrylate, acylate, cinnamate, epoxide, lactone, cyclic carbonate, tetrahydrofuran, oxetane, lactams, phosphazenes, and alkoxysilanes. In more preferred embodiments, Y is a $C_1$–$C_3$ alkyl and Z is methacrylate or epoxide.

In another aspect of the present invention, telechelic polymers of the formula

are disclosed wherein:
n is an integer;

is an alkadienyl group; and,
Z is a crosslinkable end group.
In preferred embodiments,

is a $C_4$–$C_{20}$ alkadienyl group and Z is selected from the group consisting of methacrylate, acylate, cinnamate, epoxide, lactone, cyclic carbonate, tetrahydrofuran, oxetane, lactams, phosphazenes, and alkoxysilanes. In more preferred embodiments, Z is methacrylate or epoxide.

In yet another aspect of the present invention, telechelic polymers of the formula

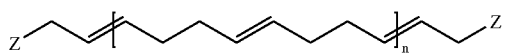

wherein n is an integer and Z is a crosslinkable end group. In preferred embodiments, Z is selected from the group consisting of methacrylate, acylate, cinnamate, epoxide, lactone, cyclic carbonate, tetrahydrofuran, oxetane, lactams, phosphazenes, and alkoxysilanes. In more preferred embodiments, Z is methacrylate or epoxide.

In another embodiment of the present inventions, methods for synthesizing the above disclosed telechelic polymers are provided.

Initiators

In general, initiators (or catalysts) that may be used in the practice of the present invention are ruthenium or osmium carbene complexes that include a ruthenium or osmium metal center that is in a +2 oxidation state, have an electron count of 16, and are penta-coordinated. More specifically, the initiators are of the formula

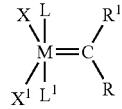

wherein:
M is ruthenium or osmium;
X and $X^1$ are independently any anionic ligand;
L and $L^1$ are any neutral electron donor ligand;
R and $R^1$ are each hydrogen or one of the following substituent groups: $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl. Optionally, the substituent group may be substituted with one or more groups selected from $C_1$–$C_5$ alkyl, $C_1$–$C_5$ alkoxy, and aryl. When the substitute aryl group is phenyl, it may be further substituted with one or more groups selected from a halogen, a $C_1$–$C_5$ alkyl, or a $C_1$–$C_5$ alkoxy. Moreover, the initiator may further include one or more functional groups. Examples of suitable functional groups include but are not limited to: hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

These ruthenium and osmium carbene complexes have been described in U.S. Pat. Nos. 5,312,940, 5,342,909, 5,710,298, and 5,831,108 and PCT Publication No. WO 98/21214, all of which are incorporated herein by reference.

In preferred embodiments of these catalysts, the R substituent is hydrogen and the $R^1$ substituent is selected from the group consisting $C_1$–$C_{20}$ alkyl, $C_2$–$C_{20}$ alkenyl, and aryl. In even more preferred embodiments, the $R^1$ substituent is phenyl or vinyl, optionally substituted with one or more moieties selected from the group consisting of $C_1$–$C_5$ alkyl, $C_1$–$C_5$ alkoxy, phenyl, and a functional group. In especially preferred embodiments, $R^1$ is phenyl or vinyl substituted with one or more moieties selected from the group consisting of chloride, bromide, iodide, fluoride, —$NO_2$, —$NMe_2$, methyl, methoxy and phenyl. In the most preferred embodiments, the $R^1$ substituent is phenyl.

In preferred embodiments of these catalysts, L and $L^1$ are each independently selected from the group consisting of phosphine, sulfonated phosphine, phosphate, phosphinite, phosphonite, arsine, stibine, ether, amine, amide, imine, sulfoxide, carboxyl, nitrosyl, pyridine, and thioether. In more preferred embodiments, L and $L^1$ are each a phosphine of the formula $PR^3R^4R^5$, where $R^3$, $R^4$, and $R^5$ are each independently aryl or $C_1$–$C_{10}$ alkyl, particularly primary alkyl, secondary alkyl or cycloalkyl. In the most preferred embodiments, the L and $L^1$ ligands are each selected from the group consisting of —P(cyclohexyl)$_3$, —P(cyclopentyl)$_3$, —P(isopropyl)$_3$, and —P(phenyl)$_3$.

In preferred embodiments of these catalysts, X and $X^1$ are each independently hydrogen, halide, or one of the following groups: $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, arylsulfonate, $C_1$–$C_{20}$ alkylsulfonate, $C_1$–$C_{20}$ alkylthio, $C_1$–$C_{20}$ alkylsulfonyl, or $C_1$–$C_{20}$ alkylsulfinyl. Optionally, X and $X^1$ may be substituted with one or more moieties selected from the group consisting of $C_1$–$C_{10}$ alkyl, $C_1$–$C_{10}$ alkoxy, and aryl which in turn may each be further substituted with one or more groups selected from halogen, $C_1$–$C_5$ alkyl, $C_1$–$C_5$ alkoxy, and phenyl. In more preferred embodiments, X and $X^1$ are halide, benzoate, $C_1$–$C_5$ carboxylate, $C_1$–$C_5$ alkyl, phenoxy, $C_1$–$C_5$ alkoxy, $C_1$–$C_5$ alkylthio, aryl, and $C_1$–$C_5$ alkyl sulfonate. In even more preferred embodiments, X and $X^1$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MCO, EtO, tosylate, mesylate, or trifluoromethanesulfonate. In the most preferred embodiments, X and $X^1$ are each chloride.

The most preferred initiators in the practice of the present invention are as described above wherein M is ruthenium; X and $X^1$ are both chloride; L and $L^1$ ligands are both —P(cyclohexyl)$_3$; R is hydrogen; and $R^1$ is either phenyl (3), (—CH=CPh$_2$) (4), or (CH=C(CH$_3$)$_2$).

The above initiators are stable in the presence of a variety of functional groups including hydroxyl, thiol, ketone, aldehyde, ester, ether, amine, imine, amide, nitro, carboxylic acid, disulfide, carbonate, isocyanate, carbodiimide, carboalkoxy, and halogen. Therefore, the starting materials and products of the reactions described below may contain one or more of these functional groups without poisoning the catalyst. In addition, the initiators are stable in the presence of aqueous, organic, or protic solvents, including aromatic hydrocarbons, chlorinated hydrocarbons, ethers, aliphatic hydrocarbons, alcohols, water, or mixtures of the above.

Using an initiator described above, practice of one embodiment of the inventive method may be summarized as follows:

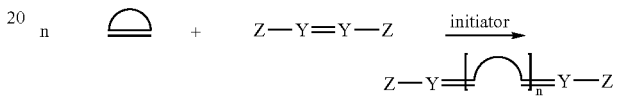

wherein:
  n is an integer;

is a cycloalkene;
  Z-Y=Y-Z is a chain transfer agent wherein Z is a crosslinkable end group and —Y=Y— is an alkenyl group; and,

is the resulting telechelic polymer.

Any cycloalkene (also referred to as cyclic olefin) that can participate in a ring-opening metathesis polymerization ("ROMP") reaction may be used. Because of the generally high metathesis activity of the initiators of the present invention, the cycloalkene may be strained or unstrained. In addition, the cycloalkene may include one or more substituent groups selected from the group consisting of $C_1$–$C_{10}$ alkyl, $C_2$–$C_{10}$ alkenyl, $C_2$–$C_{10}$ alkynyl, and aryl and one or more functional groups selected from the group consisting of hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

Illustrative examples of suitable cycloalkenes include but are not limited to: norbornene, norbornadiene, cyclopentene, dicyclopentadiene, cyclo-octene, 7-oxanorbornene, 7-oxanorbornadiene, cyclodocene, 1,3-cyclooctadiene, 1,5-cyclooctadiene, 1,3-cycloheptadiene, and derivatives thereof. In preferred embodiments, the cycloalkene is a cycloalkadiene. In more preferred embodiments, the cycloalkene is selected from the group consisting of norbornadiene, dicyclopentadiene, 1,3-cyclooctadiene, 1,5-cyclooctadiene, 1,3- cycloheptadiene, and derivatives thereof. The use of 1,3-cyclooctadiene or 1,5-cyclooctadiene as the cycloalkene is most preferred.

The chain transfer agent ("CTA") is of the general formula, Z-Y=Y-Z, wherein —Y=Y— is an alkenyl group and Z is a crosslinkable end group. As used herein, a crosslinkable end group is group that is capable of forming a covalent bond either by reacting directly with another crosslinkable end group or by reacting indirectly through a crosslinking agent with another crosslinkable end group.

In preferred embodiments, —Y=Y— is a $C_2$–$C_{20}$ alkene and Z is selected from a group consisting of methacrylate, acylate, cinnamate, epoxide, lactone, cyclic carbonate, tetrahydrofuran, oxetane, lactams, phosphazenes, and alkoxysilanes. In more preferred embodiments, —Y=Y— is a $C_2$–$C_{20}$ alkenyl and Z is methacrylate or epoxide. In the most preferred embodiments, the chain transfer agent is cis-2-butene-1,4-diol dimethacrylate (5) or cis-2-butene-1,4-diol diglycidyl ether (6).

In another embodiment, the inventive method may be summarized as follows:

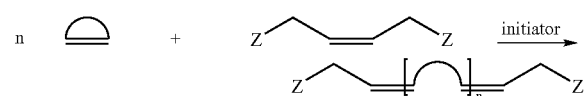

wherein n is an integer;

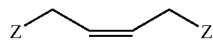

is a cycloalkene;

is a chain transfer agent wherein Z is a crosslinkable end group; and,

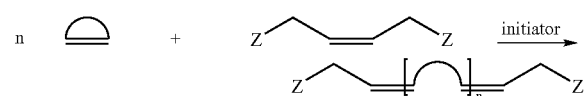

is the resulting telechelic polymer.

In preferred embodiments, the cycloalkene is selected from a group consisting of norbornene, norbornadiene, cyclopentene, dicyclopentadiene, cyclo-octene, 7-oxanorbornene, 7-oxanorbornadiene, cyclodocene, 1,3-cyclooctadiene, 1,5-cyclooctadiene, 1,3-cycloheptadiene, and derivatives thereof, and Z is selected from the group consisting of methacrylate, acylate, cinnamate, epoxides, lactone, cyclic carbonate, tetrahydrofuran, oxetane, lactams, phosphazenes, and alkoxysilanes.

In more preferred embodiments, the cycloalkene is a cycloalkadiene. In especially preferred embodiments, the cycloalkene is selected from the group consisting of norbornadiene, dicyclopentadiene, 1,3-cyclooctadiene, 1,5-cyclooctadiene, 1,3-cycloheptadiene, and derivatives thereof, and Z is methacrylate or epoxide. The use of 1,3-cyclooctadiene or 1,5-cyclooctadiene as the cycloalkene, and cis-2-butene-1,4-diol dimethacrylate (5) or cis-2-butene-1,4-diol diglycidyl ether (6) as the chain transfer agent is most preferred.

In another embodiment, the inventive method may be described as follows:

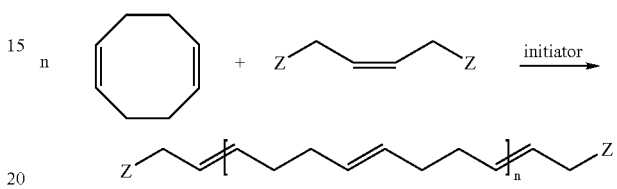

wherein n is an integer and Z is a crosslinkable end.

In preferred embodiments, Z is selected from the group consisting of methacrylate, acylate, cinnamate, epoxides, lactone, cyclic carbonate, tetrahydrofuran, oxetane, lactams, phosphazenes, and alkoxysilanes. In the most preferred embodiments, Z is either

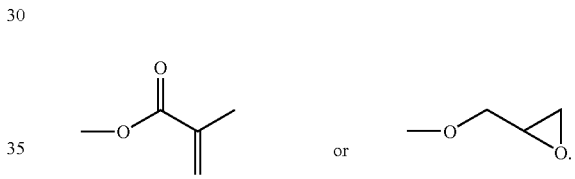

In addition to the ease of synthesis, the molecular weight of the telechelic polymer product may be readily controlled by modulating the ratio of the cycloalkene concentration to the chain transfer agent concentration. In a surprising and unexpected finding, the molecular weight of the resulting polymer is directly proportional to the molecular weight of the resulting telechelic polymer. As a result, by modulating the starting materials in the form of a [cycloalkene]/[chain transfer agent] ratio, the telechelic polymers having the desired molecular weight may be synthesized.

For the purposes of clarity, the specific details of the present invention will be illustrated with reference to especially preferred embodiments wherein the initiator is 3 or 4, the cycloalkene is cyclooctadiene, and the chain transfer agent is cis-2-butene-1,4-diol dimethacrylate (5) or cis-2-butene-1,4-diol diglycidyl ether (6). However, it should be appreciated that these embodiments and the appended experimental protocols are for purposes of illustration only and are not intended to limit the scope of the present invention.

Synthesis of the cis-2-butene-1,4-diol dimethacrylate.

Synthesis of the bis(methacrylate)-functionalized chain transfer agent, cis-2-butene-1,4-diol dimethacrylate (5), was accomplished as shown in Scheme 1.

Scheme 1

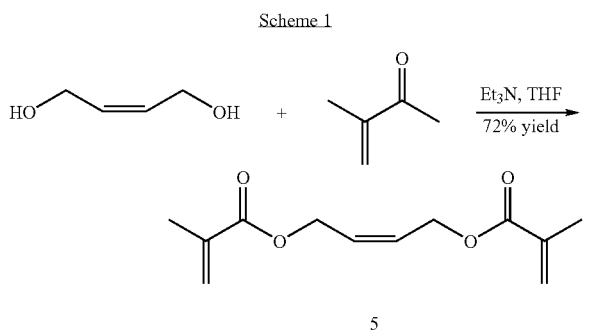

Commercially available cis-2-butene-1,4-diol was esterified using methacryloyl chloride to synthesize compound 5 in 72% yield. Because compound 5 was not generally stable, it was stored at −30° C. with 20 weight percent of p-methoxyphenol (a free radical inhibitor). In this manner, compound 5 was stored for over six months without any appreciable degradation or polymerization. Because of the general tolerance of initiators 3 and 4, compound 5 could be used without removing p-methoxyphenol prior to its use in polymerization reactions.

Synthesis of the cis-2-butene-1,4-diol diglycidyl ether.

The synthesis of the bis(epoxide)-functionalized chain transfer agent, cis-2-butene-1,4-diol diglycidyl ether (6), was accomplished in one step as illustrated in Scheme 2.

Scheme 2

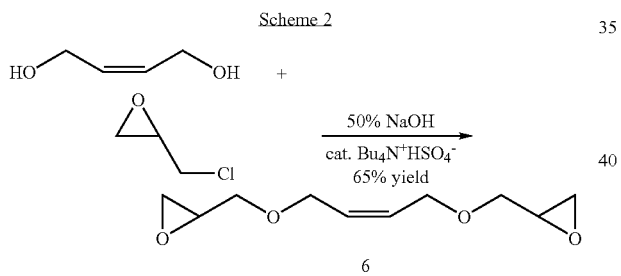

cis-2-butene-1,4-diol was treated with excess epichlorohydrin in the presence of aqueous NaOH (50% w/w) and the phase transfer catalyst, $BU_4N^+HSO_4^-$ to resulted in chain transfer agent 6 in 65% yield. Because compound 6 was extremely stable, it was purified by distillation at 105–110° C. in vacuo. Samples of compound 6 stored at room temperature for over six months, exhibited virtually no decomposition or polymerization.

Reaction of CTAs 5 and 6 with the Ruthenium Benzylidene Initiator 3.

As shown by FIG. 1, the generation of an end group functionalized ruthenium alkylidene species is a key step in the practice of the present invention. However, it was initially unclear whether a ROMP-type protocol using a chain transfer agent, Z-Y=Y-Z, would be a viable synthetic strategy. Previous mechanistic studies indicated that ruthenium-based metathesis initiators including 3 and 4 were susceptible to a side reaction where the functional end group (e.g. from a chain transfer agent) would chelate to the metal center with a concomitant loss of a L ligand (typically a phosphine). The resulting chelated species were less reactive and often decomposed on the time scale of a typical polymerization reaction. Consequently, whether reactions of ruthenium benzylidene 3 with both 5 and 6 would proceed according to Scheme 4 were investigated.

Scheme 4

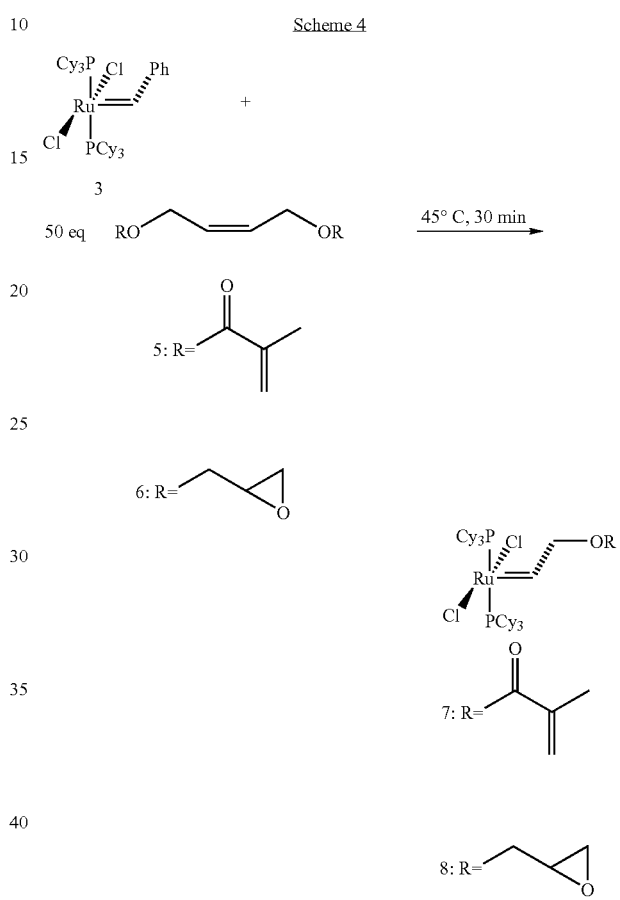

Unexpectedly, treatment of 3 with 50 equivalents of the bis(methacrylate)-functionalized CTA 5 at 45° C. for 30 min resulted in the formation of a methacrylate-functionalized ruthenium alkylidene 7 as outlined by Scheme 4. Alkylidene 7 exhibited an α-H carbene resonance at 19.48 ppm (t, $J_{HH}$=4.4 Hz) in the $^1$H NMR and a $^{31}$P resonance at 37.42 ppm with no observed free phosphine. Moreover, alkylidene 7 showed no decomposition over 24 hours at room temperature.

Similarly, treatment of 3 with 50 equivalents of the bis(epoxide)-functionalized CTA 6 at 45° C. for 30 min resulted in the formation of an epoxide-functionalized ruthenium alkylidene 8. This alkylidene exhibited an α-H carbene resonance at 19.79 ppm (t, $J_{HH}$=3.6 Hz) in the $^1$H NMR and a $^{31}$P resonance at 36.91 ppm with no observed free phosphine. Decomposition of alkylidene 8 was not observed even after being stored for 24 hours at room temperature. As a result, the lack of observed free phosphine and the $^1$H and $^{31}$P resonances indicated that telechelic polymers with crosslinkable end groups may be synthesized using ROMP in the presence of a chain transfer agent of the general formula Z-Y=Y-Z.

Polymerization of COD in the Presence of 5.

In the presence of the CTA 5, polymerization of COD resulted in the bis(methacrylate)-functionalized telechelic poly(butadiene) 9 as shown in Scheme 5.

Scheme 5

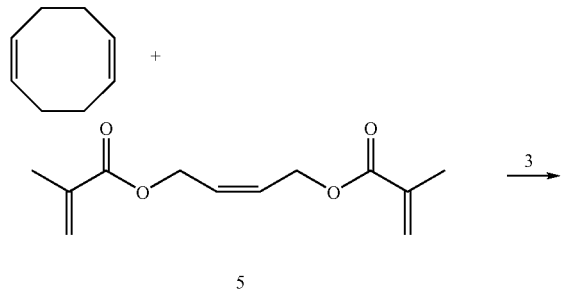

In an initial study, the impact of the [COD]/[3] ([COD]/[initiator]) ratio, reaction time, and temperature on the polymer yield and CTA incorporation was investigated. The polymerizations were run neat according to the different sets of conditions described in Table 1.

In the first two entries, reaction time and temperature were held constant at 24 h and 25° C. while the [COD]/[initiator] ratio was increased from 2000:1 to 4000:1. Although only a slight decrease in the yield of 5% was observed, the $M_n$ increased from 3500 to 5500 presumably due to a reduced incorporation of the CTA 5 during the polymerization. The impact of reaction time was investigated by comparing the results for reaction times of 24 and 48 hours (at: [COD]/[5] =10; [COD]/[initiator]=2000; and a temperature of 25° C.). As seen in the third and fourth entries, increasing the reaction time resulted in a slight increase in yield and a lower molecular weight due to an improved incorporation of 5. Unfortunately, the impact of temperature was unable to be investigated because of the relative instability of 5. For example, presumably due to the thermally-induced polymerization of the methacrylate groups, insoluble polymeric materials were formed when polymerizations were run at 45° C.

Based on these results, all COD polymerization reactions with 5 were run with a [COD]/[initiator] ratio of 2000:1 for 48 hours at 25° C. In addition, efforts were taken to minimize photo-induced polymerization of the methacrylate groups by shielding the reaction vesicle from light.

TABLE 1

| [COD]/[5] | [COD]/[initiator] | Rxn. Time (h) | Temp. (° C.) | % Yield[a] | $M_n$ (Theoretical)[b] | $M_n$ (NMR)[c] |
| --- | --- | --- | --- | --- | --- | --- |
| 15 | 2000 | 24 | 25 | 80 | 1844 | 3500 |
| 15 | 4000 | 24 | 25 | 75 | 1844 | 5500 |
| 10 | 2000 | 24 | 25 | 85 | 1304 | 2500 |
| 10 | 2000 | 48 | 25 | 87 | 1304 | 2300 |

[a] Isolated yields after purification.
[b] Determined by ([COD]/[5])(MW of COD) + (MW of 5).
[c] Determined by $^1$H NMR integration assuming a number average functionality of 2.

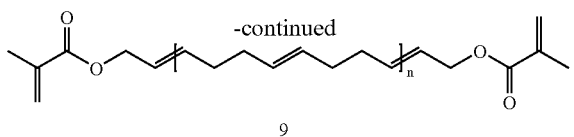

-continued

9

Practice of the present invention is extremely advantageous because of the ability to control the polymer molecular weights through the manipulation of the [monomer]/[CTA] ratio. A series of bis(methacrylate)-functionalized telechelic poly(butadiene)s were synthesized with [COD]/[5] ratios of 15, 40, 60, and 80:1. As shown by Table 2, yields between 88–90% were obtained, and the molecular weight was indeed controlled resulting in bis(methacrylate)-functionalized telechelic poly(butadiene)s with $M_n$ values between 3700 to 17700.

TABLE 2

| [COD]/[5] | % Yield[d] | % cis-Olefin (Backbone)[e] | % cis-Olefin (End Group)[e] | $M_n$ (NMR)[f] | $M_n$ (GPC)[g] | PDI[h] |
| --- | --- | --- | --- | --- | --- | --- |
| 15[a] | 88 | 50 | 25 | 3700 | 5400 | 1.74 |
| 40[a] | 89 | 55 | 20 | 8000 | 10100 | 1.86 |
| 60[b] | 90 | 60 | 25 | 14500 | 11900 | 2.02 |
| 80[c] | 90 | 55 | 25 | 17700 | 15300 | 1.99 |

[a] Polymerizations were run neat at 25° C. for 48 h with [COD]/[iinitiatorl = 2000.
[b] To ensure better mixing and higher yields, [COD] = 12.4 M in benzene was utilized.
[c] To ensure better mixing and higher yields, [COD] = 9.3 M in benzene was utilized.
[d] Isolated yields after purification.
[e] Determined by $^1$H NMR integration.
[f] Determined by $^1$H NNIR integration assuming a number average functionality of 2.
[g] Deterniined by gel permeation chromatography in $CH_2Cl_2$ relative to monodispersed polystyrene standards.

As illustrated in the plot of $M_n$ versus the [COD]/[5] ratio in FIG. 1, a direct correlation was observed between the [COD]/[5] ratio and polymer molecular weight. Although the experimentally observed molecular weights were higher than that calculated for the theoretical molecular weights, this is believed to be due to the incomplete incorporation of the chain transfer agent 5 during the polymerization.

The resulting telechelic poly(butadiene)s contained between 50–60% cis-olefin in the backbone and between 20–25% cis-olefin at the polymer end groups, and polydispersities (PDIs) of 1.74–2.02 were obtained. Both $^1$H and $^{13}$C NMR indicated an $F_n$ value near 2.

Polymerization of COD in the Presence of 6.

Polymerization of COD in the presence of the chain transfer agent 6 resulted in bis(epoxide)-functionalized telechelic poly(butadiene) 10 as shown in Scheme 6.

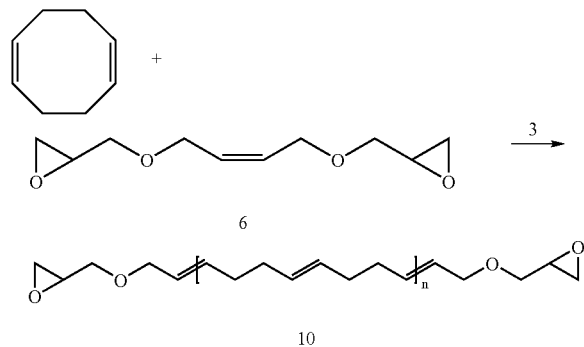

Scheme 6

The impact of the [COD]/[CTA] ratio, reaction time, and temperature on the polymer yield and the incorporation of 6 was examined. All polymerization reactions were run neat according to the conditions described in Table 3.

TABLE 3

| [COD]/ [6] | [COD]/ [initiator] | Rxn. Time (h) | Temp. (° C.) | % Yield[a] | $M_n$ (NMR)[b] |
|---|---|---|---|---|---|
| 15 | 2000 | 48 | 25 | 60 | 3700 |
| 15 | 4000 | 48 | 25 | 51 | 3600 |

TABLE 3-continued

| [COD]/ [6] | [COD]/ [initiator] | Rxn. Time (h) | Temp. (° C.) | % Yield[a] | $M_n$ (NMR)[b] |
|---|---|---|---|---|---|
| 15 | 2000 | 24 | 45 | 67 | 3400 |
| 15 | 2000 | 48 | 45 | 67 | 3400 |
| 15 | 4000 | 24 | 45 | 63 | 3500 |
| 15 | 4000 | 48 | 45 | 61 | 3700 |

[a]Isolated yields after purification.
[b]Determined by ([COD]/[6])(MW of COD) + (MW of 6).
[b]Determined by $^1$H NMR integration assuming a number average functionality of 2.

Despite similar molecular weight values, a lower yield (51% compared to 60%) was observed at the lower initiator loading. As a result, polymerization reactions in the presence of 6 were run at 25° C. and at a 2000:1 [COD]/[initiator] ratio. However, unlike the polymerization of COD in the presence of 5, polymerization reactions could be run at higher temperatures because of the relative stability of 6. Comparing entries 3–6 in Table, similar yields and molecular weights were observed regardless of changes in the reaction time or the (COD)/[initiator] ratio. Therefore, based on these results, all COD polymerization reactions in the presence of chain transfer agent 6 were carried out at 45° C. with a [COD]/[initiator] ratio of 4000:1 for 24 hours.

The effect of the [COD]/[CTA] ratio was also investigated. By varying the [COD]/[6] ratio from 15 to 80:1, $M_n$ values between 3000–16800 were obtained with yields between 71–87% (see Table 4).

TABLE 4

| [COD]/[6] | % Yield[d] | % cis-Olefin (Backbone)[e] | % cis-Olefin (End Group)[e] | $M_n$ (NMR)[f] | $M_n$ (GPC)[g] | (PDI)[g] |
|---|---|---|---|---|---|---|
| 15[a] | 71 | 60 | 30 | 3000 | 4000 | 1.55 |
| 40[a] | 80 | 65 | 25 | 7800 | 6900 | 1.89 |
| 60[b] | 87 | 50 | 30 | 11000 | 10500 | 1.87 |
| 80[c] | 84 | 55 | 25 | 16800 | 11600 | 1.94 |

[a]Polymerizations were run neat at 45° C. for 24 h with [COD]/[initiator] = 4000.
[b]To ensure better mixing and higher yields, [COD] = 12.4 M in benzene was utilized.
[c]To ensure better mixing and higher yields, [COD] = 9.3 M in benzene was utilized.
[d]Isolated yields after purification.
[e]Determined by $^1$H NMR integration.
[f]Determined by $^1$H NMR integration assuming a number average functionality of 2.
[g]Determined by gel permeation chromatography in $CH_2CL_2$ relative to monodispersed polystyrene standards.

Figure 3:
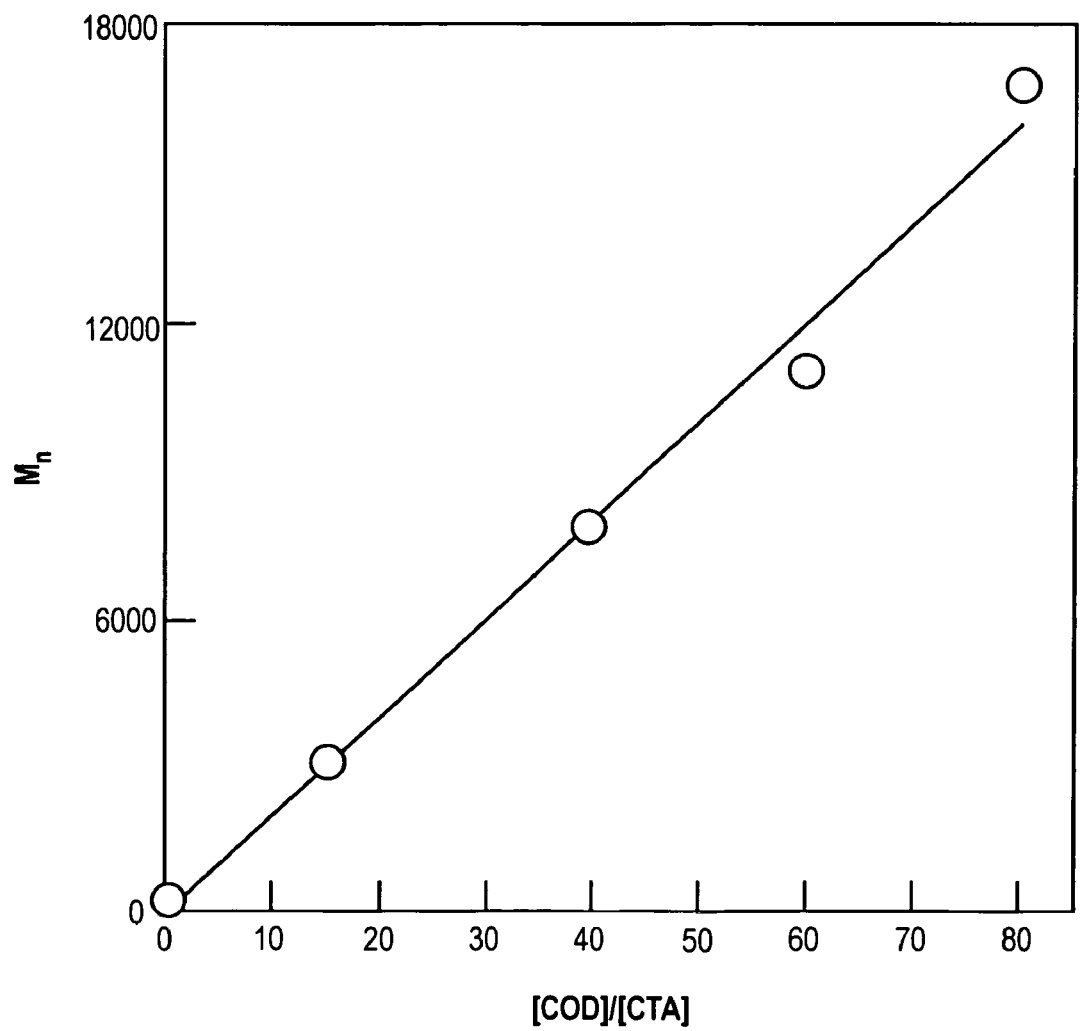
FIG. 3 is a graphic representation of the dependence of the observed M. values for the bis(epoxide)-functionalized telechelic poly(butadiene)s 10 on the [COD]/[CTAI ratio. The $M_n$ was determined. by $^1$H NMR integration assuming a number average functionality of 2.0.

As shown by FIG. 3, an excellent correlation was observed between the [COD]/[6] and polymer molecular weight ($M_n$). The bis(epoxide)-functionalized telechelic poly(butadiene)s 10 contained between 50–65% cis-olefins in the backbone and between 25–30% cis-olefins in the end groups. The observed PDIs ranged from 1.55 to 1.94. Both $^1$H and $^{13}$C NMR indicated an $F_n$ near 2 for these materials.

Crosslinking of the Telechelic poly(butadiene)s 9 and 10.

Crosslinking studies of the telechelic poly(butadiene)s 9 and 10 were conducted. Bis(methacrylate)-functionalized telechelic poly(butadiene)s 9 was crosslinked using both thermal and photochemical methods. For thermal crosslinking, concentrated solutions of polymer 9 (100 mg of polymer 9 in 200 μL toluene) ($M_n$ values between 3700 to 17700) were combined with benzoyl peroxide (2 wt %) and heated to 90° C. Within 5 minutes, a tacky insoluble material was observed, and within 15 minutes, a rubbery polymeric solid was formed which was completely insoluble in all common organic solvents including $CH_2Cl_2$, $CHCl_3$, benzene, toluene, $Et_2O$, ethyl acetate, and DMSO.

Photochemical crosslinking was induced by combining either benzoyl peroxide or 2,2-dimethoxy-2-phenylacetophenone (2 wt %) with the concentrated polymer solutions and photolyzing the solutions for 15 minutes using a 450 watt medium pressure mercury Hanovia lamp. As in the thermally-induced cross-linking reactions, a tacky insoluble material was formed within 5 minutes and a highly crosslinked rubbery material was obtained after 15 minute.

Bis(epoxide)-functionalized telechelic poly(butadiene)s 10 was crosslinked using an acid. Solutions of polymer 10 (100 mg of polymer 10 in 500 gL toluene; $M_n$ values between 3000 to 16800) were stirred with a magnetic stirrer and treated with $H_2SO_4$ (cat.). Upon addition of the acid, a rubbery polymeric solid was immediately observed which was insoluble in all common organic solvents including $CH_2Cl_2$, $CHCl_3$, benzene, toluene, $Et_2O$, ethyl acetate, and DMSO. Treatment with other acids such as HCl (1 M in $Et_2O$) and p-toluenesulfonic acid resulted in no significant cross-linking even at elevated temperatures. Treatment of the polymer solutions with $BF_3$-$Et_2O$ (cat.) resulted in crosslinking, however the crosslinking required between 2 and 3 hours at room temperature and often gave inconsistent results. Treatment with $H_2SO_4$ (cat.) was by far the simplest and most rapid method for the crosslinking of the bis (epoxide)-functionalized telechelic poly(butadiene)s 10.

It is to be understood that while the invention has been described in conjunction with the preferred specific embodiments thereof, that the foregoing description as well as the examples that follow are intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

Experimental

General Protocols

Argon was purified by passage through columns of BASF R-11 catalyst (Chemalog) and 4 A molecular sieves (Linde). NMR spectra were recorded on GE QE-300 Plus (300.1 MHz; 75.49 MHz $^{13}C$) spectrometer and a JEOL GX-400 (399.65 MHz $^1H$; 100 MHz $^{13}C$, 161.85 MHz $^{31}P$) spectrometer. $^{31}P$ NMR spectra were referenced to an external 85% $H_3PO_4$ standard. IR spectra were recorded on a Perkin-Elmer 1600 series FT-IR spectrometer. Gel permeation chromatographs were obtained on a HPLC system using an Altex model 110A pump, a Rheodyne model 7125 injector with a 100 μL injection loop, two American Polymer Standards 10 micron mixed bed columns, and a Knauer differential-refractometer using $CH_2Cl_2$ as eluent at a 1.0 mL/min flow rate. Molecular weights and polydispersities were reported versus monodispersed polystyrene standards. Photolysis was accomplished with a 450 watt medium pressure mercury Hanovia lamp.

Materials

The benzene used in polymerizations was distilled from $CaH_2$ under vacuum. Dry THF was obtained by distillation under atmospheric pressure from $CaH_2$. All other solvents were reagent grade and used without purification. cis-2-butene-1,4-diol, methacryloyl chloride, triethylamine, NaOH, $Bu_4N^+HSO_4^-$, epichlorohydrin, p-methoxyphenol, MEOH, benzoyl peroxide, 2,2-dimethoxy-2-phenylacetophenone, $BF_3Et_2O$, and $H_2SO_4$ were purchased from the Aldrich Chemical Company and used without further purification. COD was purchased from the Aldrich Chemical Company and degassed by stirring in vacuo for 2 hours before use in polymerizations.

Preparation of cis-2-butene-1,4-diol dimethacrylate (5).

cis-2-butene-1,4-diol (14.04 g, 0.16 mol, 1.0 eq) was mixed with THF (500 mL) and triethylamine (40.34 g, 0.48 mol, 3.0 eq) in a 1 L round bottom flask under argon. To the reaction flask 90% methacryloyl chloride (53.9 g, 0.46 mol, 2.9 eq) was added via an addition funnel over 1 h at 0° C. during which time a white precipitate was observed. The ice bath was then removed, and the reaction was left to stir overnight at room temperature. Deionized water (150 mL) was then added to dissolve the precipitated salts, and the reaction mixture was poured into a 2 L separatory funnel containing petroleum ether (750 mL). The organics were then washed with deionized water (3×200 mL), aqueous NaOH (15% w/w, 4×200 ni-L), and deionized water (3×200 mL). The organics were dried over $MgSO_4$ and concentrated in vacuo. The product was purified by flash column chromatography (silica gel, 5% ethyl acetate/hexanes, $R_f$=0.45) to give 26.5 g (74%) of pure product as a viscous oil. To prevent crosslinking, this material was stored with p-methoxyphenol (20 wt %) at −30° C. in a dry box. $^1H$ NMR ($CDCl_3$)8 6.08–6.06 (m, 2H), 5.81–5.71 (m, 2H), 5.54–5.52 (m, 2H), 4.78–4.69 (m, 4H), 1.90–1.89 (m, 6H); $^{13}C$ NMR ($CDCl_3$)6 166.95; 136.03, 128.01, 125.67, 60.26, 18.19; IR (thin film on a NaCl plate) 3105, 3036, 2981, 2959, 2929, 2894, 1719, 1637, 1512, 1452, 1403, 1378, 1348, 1318, 1293, 1152, 1012, 975, 942, 815, 734, 651 $cm^{-1}$; HRM S (CI) calcd for $C_{12}H_{16}O_4$ $(M+H)^+$ 225.1127, found 225–1129.

Preparation of cis-2-butene-1,4-diol diglycidyl ether (6).

In a 1L Erlenmeyer flask, epichlorohydrin (270 g, 3.00 mol, 10 eq), aqueous NaOH (50% w/w) (240 g, 3.00 mol, 10 eq), and $BU_4N^+HSO_4^-$ (5.0 g, cat.) were combined at room temperature with magnetic stirring. A thermometer was placed in the flask to monitor the temperature during the reaction. To this flask, cis-2-butene-1,4-diol (26.5 g, 0.30 mol, 1 eq) was added dropwise slowly over 30 min. The reaction was extremely exothermic, and so the temperature was maintained between 30–40° C. by controlling the addition rate as well as by intermittent cooling in an ice bath. At the end of the addition, the reaction temperature remained near 40° C. for approximately 1 h, and when it began to cool, the reaction flask was heated at 40° C. in an oil bath for an additional 1 h. The flask was allowed to cool, and then deionized water was added (200 mL). This mixture was then extracted with Et.0 (3×200 mL), dried over MgSO$_4$, and concentrated in vacuo to obtain a yellow oil. This was distilled at 0.2 mm Hg/105–110° C. to give a clear oil (38.0 g, 65% yield). $^1$H NMR (CDCl$_3$)δ 5–8–5.61 (m, 2H), 4.11–4.00 (m, 4H), 3.67 (dd, J$_1$=3.0 Hz, J$_2$=11.4 Hz, 2H), 3.30 (dd, J$_1$=5.7 Hz, J$_2$=11.4 Hz, 2H), 3.11–3.06 (m, 2H), 2.73 (dd, J$_1$=4.2 Hz, J$_2$=4.8 Hz, 2H), 2.54 (dd, J$_1$=2.7 Hz, J$_2$=4.8 Hz, 2H); $^{13}$C NMR (CDCl$_3$) δ 129.13, 70.76, 66.74, 50.61, 44.03; IR (thin film on a NaCl plate) 3055, 2999, 2922, 2867, 1511, 1472, 1439, 1411, 1327, 1253, 1162, 1094, 1016, 968, 947, 901, 855, 762 cm$^{-1}$; HRMS (CI) calcd for C$_{12}$H$_{18}$O$_2$ (M+H)$^+$ 201.1127, found 201.1128.

Reaction of CTAs 5 and 6 with the Ruthenium Bewlidene (3).

All manipulations were carried out in a dry box. In a 10 mL vial, ruthenium benzylidene 3 (6.0 mg, 7.3e-6 mot, 1.0 eq), CTA (either 5 or 6) (3.7e-4 mot, 50 eq), and C$_6$D$_6$ (0.70 mL) were combined to form a homogeneous solution. This solution was transferred to a NMR tube which was capped with a rubber septa and removed from the dry box. The NMR tube was placed in an oil bath at 45° C. for 30 min. After this time, the NMR tube was removed from the oil bath, and the reaction was analyzed by both $^1$H and $^{31}$P NMR.

General Polymerization Procedure.

All manipulations were carried out in a dry box. In a 10 mL vial, the correct amount of either 5 or 6 and COD were weighed out. In a separate vial, the initiator was weighed out and a stirbar added, and this was combined with the COD/CTA mixture. The vial was then capped, removed from the dry box, and left to stir for the desired time. For reactions involving the methacrylate CTA 5, aluminum foil was wrapped around the reaction vial to prevent photo-induced crosslinking. At the end of the desired reaction time, ethyl vinyl ether (600 eq relative to initiator) was pipetted into the vial along with an equal volume of toluene. This was left to stir for 1 h followed by precipitation into MeOH to isolate the polymer. The MeOH was decanted away, and the polymer was washed with excess fresh MeOH to remove any remaining COD or CTA. The resulting telechelic poly(butadiene)s were concentrated in vacuo and then characterized by standard methods including $^1$H NMR, $^{13}$C NMR, IR, and GPC.

Bis(methacrylate)-functionalized Telechelic poly(butadiene) (9).

Spectral data for the polymer derived from a 15:1 [COD]/[5] ratio (M$_n$ (NMR)=3700, DP=32). $^1$H NMR (CDCl$_3$) δ 6.13 (bs), 5.86–5.54 (bm), 4.68 (bd, J=6.0 Hz), 4.57 (bd, J=6.6 Hz), 2.43–1.72 (bm); $^{13}$C NMR (CDCl$_3$) δ 167.224, 167.14, 136.37, 135.49, 135.41, 134.50, 130.66, 130.42, 130.06, 129.94, 129.55, 129.38, 128.95, 128.76, 128.67, 125.34, 124.23, 124.14, 123.84, 123.67, 65.29, 60.60, 60.53, 32.93, 32.65, 32.28, 31.89, 27.66, 27.36, 27.01, 26.67, 18.34; IR (thin film on a NaCl plate) 3005, 2937, 2844, 1721, 1655, 1639, 1446, 1403, 1318, 1294, 1239, 1159, 1079, 1010, 966, 814, 733 cm$^{-1}$.

Bis(epoxide)-functionalized Telechelic poly(butadiene) (10).

Spectral data for the polymer derived from a 15:1 [COD]/[6] ratio (M$_n$ (NMR)=3000, DP=26). $^1$H NMR (CDCl$_3$) δ 5.77–5.17 (bm), 4.09–3.91 (bm), 3.72–3.61 (bm), 3.41–3.30 (bm), 3.17–3.08 (bm), 2.81–2.72 (bm), 2.62–2.53 (bm), 2.35–1.64 (bm); $^{13}$C NMR (CDCl$_3$) δ 134.49, 134.43, 133.19, 130.26, 130.03, 129.93, 129.73, 129.52, 129.35, 126.19, 126.06, 125.90, 71.95, 70.65, 70.46, 66.81, 50.72, 44.33, 44.26, 32.91, 32.63, 32.29, 32.04, 27.97, 27.63, 27.35, 27.10, 26.76; IR (thin film on a NaCl plate) 3006, 2918, 2846, 1654, 1437, 1403, 1348, 1312, 1240, 1158, 1101, 966, 845, 732 cm$^{-1}$.

Cross-linking of bis(methacrylate)-functionalized Telechelic poly(butadiene)s (9).

In a 2 mL glass vial, polymer 9 (100 mg) was dissolved in toluene (200 µL) with either benzoyl peroxide or 2,2-dimethoxy-2-phenylacetophenone (2 mg, 2 wt %). This solution was then either subjected to heat in an oil bath at 90° C. (benzoyl peroxide-initiated) or light using a 450 watt medium pressure mercury Hanovia lamp (benzoyl peroxide- or 2,2-dimethoxy-2-phenylacetophenone-initiated) in a photolysis chamber. Although an insoluble material was formed within 5 min under these conditions for each of the different molecular weight polymers synthesized, heating or photolysis for 15 min resulted in a more highly crosslinked rubbery material which was completely insoluble in all common organic solvents including CH$_2$Cl$_2$, CHCl$_3$, benzene, toluene, Et$_2$O, ethyl acetate, and DMSO.

Cross-linking of bis(epoxide)-functionalized Telechelic poly(butadiene)s (10).

In a 2 mL vial, polymer 10 (100 mg) was dissolved in toluene (500 µL) and a stir bar was added. This solution was then stirred at room temperature and H$_2$SO$_4$ (cat.) was added. Immediate formation of an insoluble rubbery solid was observed for each of the different molecular weight polymers synthesized. These materials were completely insoluble in all common organic solvents including CH$_2$Cl$_2$, CHCl$_3$, benzene, toluene, Et$_2$O, ethyl acetate, and DMSO.

We claim:
1. A method for synthesizing a polymer of the formula

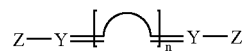

comprising contacting a cycloalkene with a initiator of the formula

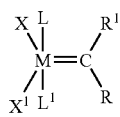

in the presence of a chain transfer agent of the formula Z-Y=Y-Z wherein:
n is an integer;
—Y=Y— is an alkenyl group;
Z is a crosslinkable group;
M is ruthenium or osmium;

X and $X^1$ are independently any anionic ligand;

L and $L^1$ are any neutral electron donor ligand; and

R and $R^1$ are each hydrogen or a substituent group selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, the substituent group optionally substituted with one or more moieties selected from the group consisting of $C_1$–$C_5$ alkyl, $C_1$–$C_5$ alkoxy, aryl and a functional group wherein the functional group is selected from the group consisting of hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

2. The method of claim 1, wherein:

M is ruthenium;

X and $X^1$ are each halide;

L and $L^1$ each a phosphine of the formula $PR^3R^4R^5$, where $R^3$, $R^4$, and $R^5$ are each independently aryl or $C_1$–$C_{10}$ alkyl;

R is hydrogen; and, $R^1$ is phenyl or vinyl, optionally substituted with one or more moieties selected from the group consisting of $C_1$–$C_5$ alkyl, $C_1$–$C_5$ alkoxy, phenyl, and a functional group selected from the group consisting of chloride, bromide, iodide, fluoride, —$NO_2$, —$NMe_2$, methyl, methoxy and phenyl.

3. The method of claim 2, wherein:

X and $X^1$ are each chloride;

L and $L^1$ are each selected from the group consisting of —P(cyclohexyl)$_3$, —P(cyclopentyl)$_3$, —P(isopropyl)$_3$, and P(phenyl)$_3$; and, R is phenyl.

4. The method of claim 1, wherein the cycloalkene is selected from the group consisting of norbornene, norbornadiene, cyclopentene, dicyclopentadiene, cyclo-octene, 7-oxanorbornene, 7-oxanorbornadiene, cyclodocene, 1,3-cyclooctadiene, 1,5-cyclooctadiene, 1,3-cycloheptadiene, and derivatives thereof.

5. The method of claim 1, wherein the cycloalkene is a cycloalkadiene.

6. The method of claim 1, wherein —Y═Y— is a $C_2$–$C_{20}$ alkene and Z is selected from a group consisting of methacrylate, acylate, cinnainate, epoxide, lactone, cyclic carbonate, tetrahydrofuran, oxetane, lactam, phosphazene, and alkoxysilane.

7. The method of claim 6, wherein —Y═Y— is a $C_2$–$C_{10}$ alkene and Z is methacrylate or epoxide.

8. The method of claim 7, wherein the cycloalkene is cyclooctadiene and Z-Y═Y-Z is cis-2-butene-1,4-diol dimethacrylate or cis-2-butene-1,4-diol diglycidyl ether.

9. A method for synthesizing a polymer of the formula

comprising contacting a cycloalkene with a initiator of the formula

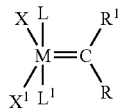

in the presence of a chain transfer agent of the formula

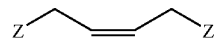

wherein:

n is an integer;

—Y═Y— is an alkenyl group;

Z is a crosslinkable group;

M is ruthenium;

X and $X^1$ are each halide;

L and $L^1$ each a phosphine of the formula $PR^3R^4R^5$, where $R^3$, $R^4$, and $R^5$ are each independently aryl or $C_1$–$C_{10}$ alkyl;

R substituent is hydrogen; and, $R^1$ is phenyl or vinyl, optionally substituted with one or more moieties selected from the group consisting of $C_1$–$C_5$ alkyl, $C_1$–$C_5$ alkoxy, phenyl, and a functional group selected from the group consisting of chloride, bromide, iodide, fluoride, —$NO_2$, —$NMe_2$, methyl, methoxy and phenyl.

10. The method of claim 9, wherein:

X and $X^1$ are each chloride;

L and $L^1$ are each selected from the group consisting of —P(cyclohexyl)$_3$, —P(cyclopentyl)$_3$, —P(isopropyl)$_3$, and —P(phenyl)$_3$; and, R is selected from the group consisting of phenyl, CH═$CPh_2$ and CH═$C(CH_3)_2$.

11. The method of claim 10, wherein the cycloalkene is selected from the group consisting of norbornene, norbornadiene, cyclopentene, dicyclopentadiene, cyclo-octene, 7-oxanorbornene, 7-oxanorbornadiene, cyclodocene, 1,3-cyclooctadiene, 1,5-cyclooctadiene, 1,3-cycloheptadiene, and derivatives thereof.

12. The method of claim 10, wherein the cycloalkene is a cycloalkadiene.

13. The method of claim 12, wherein the cycloalkadiene is selected from the group consisting of norbornadiene, dicyclopentadiene, 1,3-cyclooctadiene, 1,5-cyclooctadiene, 1,3-cycloheptadiene, and derivatives thereof.

14. The method of claim 9, wherein Z is selected from the group consisting of methacrylate, acylate, cinnamate, epoxide, lactone, cyclic carbonate, tetrahydrofuran, oxetane, lactam, phosphazene, and trialkoxysilane.

15. The method of claim 12, wherein

is cis-2-butene-1,4-diol dimethacrylate or cis-2-butene-1,4-diol diglycidyl ether.

16. The method of claim 15, wherein the cycloalkadiene is cyclooctadiene.

17. A method for synthesizing a polymer of the formula $$Z\diagup\!\!\!\diagup\!\!\!\diagdown\!\!\!\diagup\!\!\!\diagdown\!\!\!\diagup\!\!\!\diagdown_n Z$$

comprising reacting

[cyclooctadiene structure]

with an initiator of the formula $$\begin{array}{c} X \;\; L \\ \diagdown | \\ M = C \diagup^{R^1} \\ \diagup | \;\;\;\diagdown R \\ X^1 \;\; L^1 \end{array}$$

in the presence of a chain transfer agent of the formula $$Z\diagup\!\!\!=\!\!\!\diagdown Z$$

wherein:
n is an integer;
Z is a crosslinkable group;
M is ruthenium;
X and $X^1$ are each chloride;
L and $L^1$ are each selected from the group consisting of —P(cyclohexyl)$_3$, —P(cyclopentyl)$_3$, —P(isopropyl)$_3$, and —P(phenyl)$_3$;
R substituent is hydrogen; and,
$R^1$ is phenyl or vinyl, optionally substituted with one or more moieties selected from the group consisting of $C_1$–$C_5$ alkyl, $C_1$–$C_5$ alkoxy, phenyl, and a functional group selected from the group consisting of chloride, bromide, iodide, fluoride, —NO$_2$, —NMe$_2$, methyl, methoxy and phenyl.

18. The method of claim 17, wherein R is phenyl, CH=CPh$_2$, or CH=C(CH$_3$)$_2$.

19. The method of claim 18, wherein Z is selected from the group consisting of methacrylate, acylate, cinnamate, epoxide, lactone, cyclic carbonate, tetrahydrofuran, oxetane, lactam, phosphazene, and alkoxysilane.

20. The method of claim 19, wherein Z is

[methacrylate structure] or [epoxide structure].

21. A method for controlling the molecular weight of a telechelic polymer synthesized using a ring-opening polymerization reaction of a cycloalkene and a ruthenium metathesis initiator in the presence of a functionalized chain transfer agent comprising modulating the ratio of the concentration of the cycloalkene to the concentration of the chain transfer agent.

22. The method of claim 21, wherein the cycloalkene is a cycloalkadiene selected from the group consisting of norbornadiene, dicyclopentadiene, 1,3-cyclooctadiene, 1,5-cyclooctadiene, 1,3-cycloheptadiene, and derivatives thereof.

23. The method of claim 22, wherein the functionalized chain transfer agent is of the formula $$Z\diagup\!\!\!=\!\!\!\diagdown Z$$

wherein Z is a crosslinkable end group selected from the group consisting of methacrylate, acylate, cinnamate, epoxide, lactone, cyclic carbonate, tetrahydrofuran, oxetane, lactam, phosphazene, and alkoxysilane.

24. The method of claim 21, wherein the ruthenium metathesis initiator is of the formula $$\begin{array}{c} Cy_3P \;\; Cl \\ \diagdown | \\ Ru = C \diagup^{R'} \\ \diagup | \;\;\;\diagdown R \\ Cl \;\; PCy_3 \end{array}$$

wherein
Cy is cyclohexyl or cyclopentyl;
R is hydrogen; and,
$R^1$ is phenyl, CH=CPh$_2$, or CH=C(CH$_3$)$_2$.

25. A method for preparing crosslinked polymers comprising:
contacting a cycloalkene with a initiator of the formula $$\begin{array}{c} Cy_3P \;\; Cl \\ \diagdown | \\ Ru = C \diagup^{R'} \\ \diagup | \;\;\;\diagdown R \\ Cl \;\; PCy_3 \end{array}$$

in the presence of a chain transfer agent of the formula $$Z\diagup\!\!\!=\!\!\!\diagdown Z$$

to make a polymer of the formula $$Z\diagup\!\!\!\diagup\!\!\!\diagdown\!\!\!\diagup\!\!\!\diagdown\!\!\!\diagup\!\!\!\diagdown_n Z$$

and treating the polymer with a crosslinking agent wherein:
n is an integer;
Z is a crosslinkable group selected from a group consisting of methacrylate, acylate, cinnamate, epoxide, lactone, cyclic carbonate, tetrahydrofuran, oxetane, lactam, phosphazene, and alkoxysilane;
Cy is cyclohexyl or cyclopentyl;
R is hydrogen; and
$R^1$ is phenyl, CH=CPh$_2$, or CH=C(CH$_3$)$_2$.

26. The method of claim 25, wherein Z is

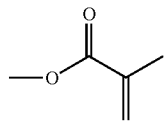

and the crosslinking agent is heat in combination with benzoyl peroxide.

27. The method of claim 25, wherein Z is

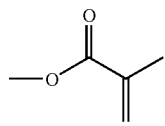

and the crosslinking agent is light in combination with benzoyl peroxide or 2,2-dimethoxy-2-phenylacetophenone.

28. The method of claim 25, wherein Z is

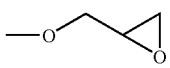

and the crosslinking agent is $H_2SO_4$.

29. A linear polymer of the general formula

wherein:
n is an integer,

is an alkadienyl group;
Y is an alkyl group; and,
Z is a crosslinkable end group.

30. The polymer of claim 28, wherein:

is a $C_4$–$C_{20}$ alkadienyl group;
Y is a $C_1$–$C_{10}$ alkyl; and
Z is selected from the group consisting of methacrylate, acylate, cinnamate, epoxide, lactone, cyclic carbonate, tetrahydrofuran, oxetane, lactams, phosphazenes, and alkoxysilanes.

31. The polymer of claim 28, having the formula

32. The polymer of claim 28, having the formula

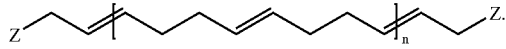

33. The polymer of claim 30, wherein Z is methacrylate or epoxide.

34. The polymer of claim 31, wherein Z is methacrylate or epoxide.

* * * * *